United States Patent [19]

Suenaga et al.

[11] 4,301,353

[45] Nov. 17, 1981

[54] METHOD FOR PRODUCING MAGNETIC HEAD

[75] Inventors: Masahide Suenaga, Odawara; Noboru Shimizu, Tokorozawa; Mitsuhiro Kudo, Tokyo; Hiroshi Yamaguchi, Fujisawa; Masao Mitani, Yokohama, all of Japan

[73] Assignee: Hitachi, Ltd., Tokyo, Japan

[21] Appl. No.: 125,702

[22] Filed: Feb. 28, 1980

[30] Foreign Application Priority Data

Mar. 5, 1979 [JP] Japan .................................. 54-24501

[51] Int. Cl.³ ............................................ B23K 27/00
[52] U.S. Cl. ................................. 219/121 LJ; 29/603;
219/121 LH; 219/121 LP
[58] Field of Search .................. 219/121 LH, 121 LJ,
219/121 LG, 121 LP; 360/125, 121, 119;
29/603

[56] References Cited

U.S. PATENT DOCUMENTS

| | | | |
|---|---|---|---|
| 3,621,153 | 11/1971 | Wenner | 360/119 X |
| 3,927,470 | 12/1975 | Case | 29/603 |
| 4,017,965 | 4/1977 | Brutsch et al. | 219/121 LM X |
| 4,100,584 | 7/1978 | Behr et al. | 219/121 LH X |
| 4,186,480 | 2/1980 | Kriegelstein et al. | 360/122 X |

*Primary Examiner*—C. L. Albritton
*Attorney, Agent, or Firm*—Craig and Antonelli

[57] ABSTRACT

A method for producing a magnetic head, comprising the step of irradiating peripheral parts other than a track portion and/or a slider portion with a laser beam so as to selectively remove surface parts of the irradiated parts, thereby to form the track portion and/or the slider portion. According to this method, the track portion and/or the slider portion of the magnetic head can be worked at high working rate, at high precision and with low working deformation, with the result that the magnetic head of excellent reproduced output and crosstalk characteristics can be readily manufactured.

5 Claims, 8 Drawing Figures

METHOD FOR PRODUCING MAGNETIC HEAD

BACKGROUND OF THE INVENTION

1. Field of the Invention

This invention relates to a method for producing a magnetic head which is carried on a magnetic disc apparatus, a magnetic tape apparatus, etc. and which can realize a magnetic recording of high density. More particularly, it relates to a method for producing a magnetic head wherein the track portion and/or slider portion of a core made of ferrite, an Fe-Al-Si alloy or the like is worked precisely with low deformation. More specifically, it relates to a method for working the track portion and/or slider portion of a magnetic head core.

2. Brief Description of the Prior Art:

In recent years, as the density of recording has become higher, the track portion of a magnetic head has tended to become increasingly narrower.

Heretofore, the track portion of a ferrite magnetic head has been principally worked by grinding or mechanical polishing. However, by way of example, in the case where a track portion having a width of 20 μm or less is worked by this method, chipping attributed to the brittleness of the ferrite or the influence of a worked layer or deformed layer is not insignificant, and inevitably the available percentage of production or the performance of the magnetic head lowers sharply. Especially, it is a problem that the reproduced output characteristics of such devices and the crosstalk characteristics are unsatisfactory.

As alternative methods, there have been proposed ion etching and electrolytic etching, each of which employs a mask having a pattern corresponding to a configuration to be worked. These processes, however, have the fatal disadvantage in practice that the erosion rate is low, so that such methods have not been put into practical use as yet. With, for example, the ion etching process, even when the etching is performed for 1 hour, the amount of ferrite removed is only about 1 μm. Accordingly, a working time of at least 50 hours is necessary for ion etching of 50 μm or more as required ordinarily. It is next to impossible to spend such a long time in production, from a point of view of economy of manufacture.

As an improvement on the aforecited method, there has also been proposed a method wherein a core made of ferrite is ion-etched with its track portion covered with a mask, to remove the other area than the masked portion to a depth of approximately 5 μm, whereupon as an auxiliary working, the gap portion other than the track portion is cut with a laser beam or the like so as to adjust the track width. However, this method also has the problem that an increase in the production cost is incurred on account of the complicated manufacturing process, so it also has not been put into practical use as yet.

As known arts akin to this invention, the following can be mentioned:
(i) Japanese Patent Application Publication Specification No. 39-18284, and
(ii) Japanese Patent Application Laid-open Specification No. 51-114111.

SUMMARY OF THE INVENTION

This invention has for its object to provide a method for producing a magnetic head which eliminates the difficulties of the prior art described above.

More specifically, an object of this invention is to provide a method for producing a magnetic head in which the track portion and/or slider portion of the magnetic head made of ferrite, Sen-alloy or the like is worked at high removal rate, at high precision and with low working deformation.

Further, an object of this invention is to provide a method for readily producing a magnetic head of excellent reproduced output characteristics and crosstalk characteristics.

More specifically, an object of this invention is to provide a working method which works the track portion and/or slider portion of a magnetic head core at high removal rate, at high precision and with low working deformation.

In order to accomplish these objects, a method for producing a magnetic head according to this invention comprises the step of irradiating peripheral parts other than the track portion and/or slider portion of a magnetic head core having a predetermined shape, with a laser beam, to selectively remove the surface parts of the irradiated parts, thereby to form the track portion and/or slider portion. Other steps may be the same as in the prior art.

The core is made of a ferrite such as Ni-Zn ferrite and Mn-Zn ferrite, or a high permeability alloy such as Fe-Al-Si alloy (called "Sen-alloy"). In the case where the core made of such material is worked with a laser by the method of this invention, it is unnecessary to sharply change manufacturing conditions (such as energy density and pulse width).

The track portion of the roughly-machined magnetic head core to be worked by the irradiation with the laser beam shall have a width which is somewhat greater than a predetermined finishing size of the track width. Usually, the rough machining is carried out by the well-known machinework. Regarding the difference between the width of the roughly machined track portion and the width of the track portion subjected to the working by the laser irradiation, in other words, the finishing allowance of the track portion, approximately the finishing length of the track portion (about 100 μm in a monolithic type head for a magnetic disc) on either side is, in general, the maximum value, and a smaller value is more favorable because the required power of the laser may be lower. Since, however, an enhancement in the precision of the machinework of the rough machining degrades economy, ordinarily the finishing allowance is made at most approximately 20 μm on either side. When the track width of the rough machining is made much greater than the finishing length of the track portion, it is necessary to make the diameter of the laser beam much greater than the finishing length of the track portion or to make the scanning area of the laser beam much larger. This is uneconomical in the necessity for a laser of high power or a long time of machining. It is therefore desirable that the finishing allowance of the track portion is made less than approximately the finishing length of the track portion on either side (the track width of the rough machining becomes double or more of the finishing length). However, when the economy is not especially considered, a larger finishing allowance may well be set. In addition, when the economy is not taken into account, the finishing allowance may well be made small down to approximately 1 μm on either side. In this case, however, the positioning of the irradiating laser beam is severe.

In order to irradiate the peripheral parts with the laser beam so as to leave the necessary part of a predetermined pattern of the track portion and/or slider portion behind, the laser beam may be passed through a slit which is constructed so as to intercept the light from the predetermined pattern part, and the resulting slit image may be focused on a surface to be worked (hereinbelow, such laser beam throwing method shall be written "slit projection method").

As the laser for working the narrow track, one of high power and comparatively short wavelength is desirable. The required power of the laser differs depending upon the melting point, reflection factor etc. of the core material. By way of example, in machining the ferrite, an energy density of about $10^9$ W/cm$^2$ is required, so that a power of 100 KW is needed in case of working an area of 100 μm square at one time by the use of the slit projection method. In such case, it suffices to irradiate an identical place with 1–5 shots of laser pulses having a pulse width of 0.2 μs. It is also necessary that the wavelength of the laser beam to be used is still shorter than the accuracy of finishing of the magnetic head. Since the aim of the finishing accuracy of the laser working in this invention is ±1 μm, it is desirable that the wavelength of the laser beam to be used is not longer than 1 μm. As lasers fulfilling such condition, there are ruby laser ($\lambda = 0.69$ μm), Nd$^{3+}$:glass laser ($\lambda = 1.06$ μm), Nd$^{3+}$:YAG laser ($\lambda = 1.06$ μm), N$_2$-dye laser ($\lambda = 0.51$ μm) and Ar laser ($\lambda = 0.49$ μm, 0.51 μm). Here, $\lambda$ indicates the wavelength of the laser beam. Among these lasers, the ruby laser and the Nd$^{3+}$:glass laser have the drawback that they are hard of use because of difficult continuous oscillations. The Ar laser has a somewhat low power, which is insufficient when the power of approximately 100 KW is required.

The material of the slit to be employed in the slit projection method may be one of comparatively high melting point which can be finely machined. Ceramics, high-melting metallic materials, etc. are employed.

In the above, the slit projection method has been chiefly described. However, in order to irradiate with the laser beam the peripheral parts other than the necessary part of the predetermined pattern of the track portion and/or slider portion, the spot of a converged laser beam may well be thrown on the surface to-be-worked and scanned so as to irradiate the whole area of the surface to-be-worked with the laser beam (hereinbelow, such laser beam throwing method shall be written "spot scanning method").

By way of example, the laser beam is scanned in a certain direction with a rotating polygon mirror and is allowed to pass through a slit so as to fall on the surface to-be-worked which has been cut into a predetermined width and which is moving at a fixed speed in the direction perpendicular to the scanning direction, whereby a rectangular area can be worked by the spot scanning method. As compared with the slit projection method, the spot scanning method has the merit that the power of the laser source may be far lower, but it has the demerit that the finishing accuracy is somewhat lower. Although also the working period of time is comparatively long, it is negligible in comparison with the period of time required for attaching the workpiece to the working equipment.

By producing the magnetic head core in conformity with the method for producing a magnetic head according to this invention as set forth above, the magnetic head which has the track portion and/or slider portion at high precision (approximately ±1 μm in terms of the accuracy of finishing) and with low working deformation can be manufactured at high working rate (the magnetic head can be worked by 1–10 shots of laser irradiation, one shot being approximately 10 nsec–1 μsec). The magnetic head thus produced is also excellent in point of characteristics. By way of example, the magnetic head produced by working the narrow track portion in accordance with the method of this invention has the following features: (i) The laser working gives rise to less deformation than the ordinary machining (machinework), and the influence of the former is less than that of the latter, so that the reproduced output level is higher. (ii) Since the inclination angle of the side surface of the track portion can be brought closer to the right angle than in the prior arts, the crosstalk from the adjacent track can be reduced, and a guard band to be provided on a recording medium can be narrowed for an identical quantity of crosstalk.

In the case of a track width of 20 μm, the magnetic head whose track portion has been worked by the method of this invention exhibits a reproduced output level which is about 20% higher than that of a magnetic head whose track portion has been worked by the machining. This effect is greater as the track width becomes smaller.

In the case where the track portion of the magnetic head is worked by the method of this invention, the inclination angle $\theta$ of the side surface of the track portion as illustrated in FIG. 3c can be made 70° or greater. Therefore, the guard band which is provided on the recording medium in order to reduce the amount of crosstalk can be narrowed, that is, the track interval can be narrowed. By way of example, in the case where the track width is 30 μm and where the maximum recording wavelength is 25 μm, a guard band for making a signal from the adjacent track at most -25 dB may be about 15 μm. This is approximately 10 μm narrower than about 25 μm which is a value in the case of employing a head ($\theta$ being approximately 45°) produced by the usual machinework.

In this manner, according to the method of the present invention, there can be achieved the simplification of the manufacturing process, shortening of the working time, enhancement of the finishing accuracy, reduction of the deformed layers, and enhancement of the magnetic head performance.

This invention is applicable to monolithic type heads for magnetic discs, magnetic heads for VTRs, and all other magnetic heads having heretofore been known and requiring precise working of track portions.

DESCRIPTION OF THE PRESENTLY PREFERRED EMBODIMENTS

EXAMPLE 1

Figure 1:
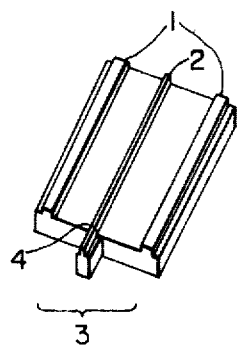
FIG. 1 is a perspective view showing the configuration of a core slider to be worked by laser.
Figure 2:
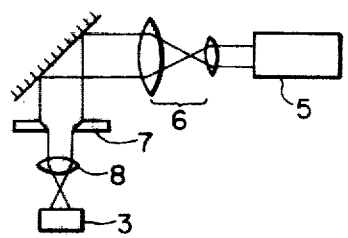
FIG. 2 is an explanatory view of a laser working method based on the slit projection method in this invention.
Figure 3A:
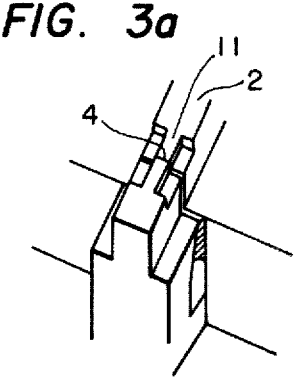
FIG. 3a is a perspective view showing the vicinity of the track portion of the core slider, the track portion having been worked by the method of this invention.
Figure 3B:
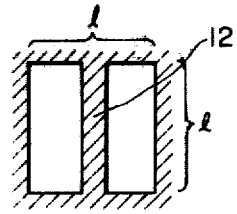
FIG. 3b is a plan view showing the shape of a slit used in an embodiment of this invention.
Figure 3C:
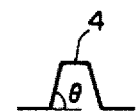
FIG. 3c is an enlarged sectional view of the worked track portion.

FIGS. 1 to 3c illustrate a method in which the track portion of a monolithic head for a magnetic disc is worked by the slit projection method being one of the available laser machining processes. In this method, first of all, as shown in FIG. 1, sliders or side rails 1 and a center rail 2 which has a width of approximately 50 $\mu$m greater than a desired track width are formed by the grinding or the polishing. Thus, a core slider 3 is prepared. Subsequently, as shown in FIG. 2, a laser beam which is emitted from a laser source 5, magnified by a beam expander 6 composed of convex lenses, and contracted and shaped by a slit 7 made of alumina, Ti, Mo or stainless steel and a lens 8 is projected onto operating gap portions 4 of the core slider 3 so as to remove the surfaces of the irradiated portions. In this case, it is necessary that the slit has a track pattern in the same shape as that of a track to be worked, and also that the surface to-be-worked of the core slider is brought into coincidence with the focusing plane of the optical system, while the track pattern in a slit image is brought into coincidence with a place in which the track is to be formed. FIG. 3a illustrates a result in the case where the track portion has been worked by the use of the slit having a light intercepting part 12 as shown in FIG. 3b. Shown at 11 is the track portion. FIG. 3c shows an enlarged sectional view of the worked track portion. It has been revealed that, in order to perform the working as shown in FIG. 3a by employing as the laser source an Nd:YAG laser which effects pulse oscillation through Q-switching and by removing the ferrite surface for approximately 50 $\mu$m with the laser beam which is shaped into a regular square with each side l being 100 $\mu$m and which has an intercepted part corresponding to the track portion, an identical place may be irradiated with 1-5 shots of the laser beam having a peak output of 100 kW and a pulse width of 0.2 $\mu$s. The read-write characteristics of the monolithic type head whose track portion was thus worked were much more excellent than those of the head whose track portion was worked by the polishing as stated previously. The output level increased approximately 20%, and the guard band could be made 10 $\mu$m narrower.

EXAMPLE 2

Figure 4A:
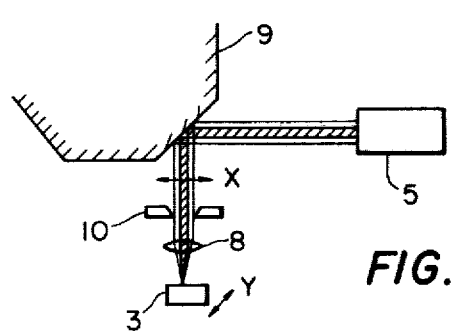
FIG. 4a is an explanatory view of a laser working method based on the spot scanning method in this invention.

While, in Example 1, the track portion has been described as being worked by the slit projection method, a similar working can be performed by the spot scanning method as illustrated in FIG. 4a. In the present example applied to the working of the peripheral parts of the track portion, as shown in FIG. 4a, a beam of a YAG laser was scanned in, for example, the X-direction by means of a rotating polygon mirror 9 and was let pass through a slit 10 made of stainless steel, thereby to be cut into a predetermined width. Further, it was condensed so as to render the spot diameter 10 $\mu$m and was projected onto the surface of the workpiece moving at a fixed speed in the Y-direction. In this regard, it is more preferable that the X-direction agrees with the longitudinal direction of the track. The scanning rate and the workpiece moving rate were set so as to render the spot interval 5 $\mu$m. In this way, a laser worked part was obtained which was shaped into a regular square with each side being 100 $\mu$m and which had an unworked part corresponding to the track portion.

Figure 4B:
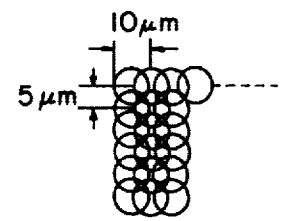
FIG. 4b is a sketch showing the traces of a laser beam spot thrown on a surface to-be-worked.

FIG. 4b shows the traces of the laser beam spot to be thrown on the surface to-be-worked. As compared with the slit projection method, the spot scanning method has the merit that the power of the laser source may be approximately two orders smaller, whereas it has the demerits, (1) that the finishing accuracy of a track end is comparatively low and (2) that the working period of time is comparatively long. Regarding the finishing accuracy of the demerits, it has been revealed that it can be enhanced up to at least $\pm 2$ $\mu$m by making the spot diameter 5 $\mu$m. The working period of time could be made within 10 seconds which is shorter than a period of time (about 2 minutes) required for locating the core slider.

Figure 5:
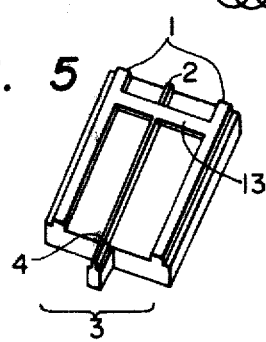
FIG. 5 is a perspective view showing the configuration of a negative pressure type slider worked by the method of this invention.

Although, in the above, the methods for working the track portions of the magnetic heads by means of the laser beams have been described, slider portions can also be worked by similar methods. More specifically, the slider 1 which is somewhat wider than a predetermined slider width is formed by grinding as shown in FIG. 1, whereupon the unnecessary parts thereof are irradiated with the laser beam so as to remove the surfaces of the irradiated parts. Via such step, the working of the slider portion can be performed at high precision in a short time. Moreover, it has been revealed that the falling-off of crystal grains prone to occur upon contact of the head with the disc and ascribable to the grinding can be sharply reduced. Further, this method has turned out to be especially effective for working a negative pressure type slider (having a cross rail 13) which is shown in FIG. 5 and which cannot be realized by the ordinary machining.

It is understood from the foregoing examples that the simplification of the manufacturing process, the shortening of the working period of time and the enhancement of the finishing accuracy as well as the head performance can be accomplished by carrying out this invention.

Obviously many modification and variations of the present invention are possible in the light of the above teachings. It is therefore to be understood that within the scope of the appended claims the invention may be practiced otherwise than as specifically described.

What is claimed is:

1. A method for producing a magnetic head comprising the steps of irradiating peripheral parts other than a track portion of a magnetic head core with a laser beam so as to selectively remove a portion of the surface of the irradiated parts, thereby to form said track portion including passing said laser beam through a slit having a predetermined pattern to shape said beam and then focusing the shaped beam onto said magnetic head core to thereby irradiate said peripheral parts with said laser beam.

2. A method for producing a magnetic head as defined in claim 1, wherein said core is made of ferrite.

3. A method for producing a magnetic head as defined in claim 1, wherein said slit is made of ceramics.

4. A method for producing a magnetic head as defined in claim 1, wherein said core is made of a high-permeability alloy.

5. A method for producing a magnetic head as defined in claim 1, wherein said slit is made of a high-melting point metal material.

* * * * *